United States Patent [19]

Togashi et al.

[11] Patent Number: 5,015,716

[45] Date of Patent: May 14, 1991

[54] PARTICULATE MATERIAL COMPRISING A PLATINUM-CONTAINING HYDROSILYLATON CATALYST AND A DIORGANOPOLYSILANE

[75] Inventors: Atsushi Togashi, Ichihara; Toshio Saruyama, Narashino, both of Japan

[73] Assignee: Toray Silicone Company, Limited, Tokyo, Japan

[21] Appl. No.: 370,418

[22] Filed: Jun. 22, 1989

[30] Foreign Application Priority Data

Jun. 29, 1988 [JP] Japan .................................. 63-161355

[51] Int. Cl.$^5$ ............................................. C08G 77/06
[52] U.S. Cl. ........................................ 528/15; 528/31; 528/32; 525/478; 427/213.36
[58] Field of Search ...................... 427/213.36; 528/15, 528/31, 32; 525/478

[56] References Cited

U.S. PATENT DOCUMENTS 4,293,677 10/1981 Imai .......................................... 528/15
4,481,341 11/1984 Schlak et al. ........................ 525/478
4,784,879 11/1988 Lee et al. .......................... 427/213.34

FOREIGN PATENT DOCUMENTS 134786 12/1974 Japan .

Primary Examiner—Melvyn I. Marquis
Attorney, Agent, or Firm—Robert Spector

[57] ABSTRACT

This invention provides particulate catalyst compositions comprising a platinum-containing hydrosilation reaction catalyst and a polydiorganosilane exhibiting a softening point of from 50° to 200° C. The average particle size of the particulate does not exceed 100 micrometers, and the surface layer of the particulate is substantially free of said catalyst. Curable organopolysiloxane compositions containing the present catalyst compositions exhibit excellent storage stability.

6 Claims, No Drawings

PARTICULATE MATERIAL COMPRISING A PLATINUM-CONTAINING HYDROSILYLATON CATALYST AND A DIORGANOPOLYSILANE

BACKGROUND OF THE INVENTION

1. Field of the Invention

The present invention relates to a composition in particulate form comprising a platinum-containing hydrosilylation reaction catalyst and an organosilicon material. More Particularly, the present invention relates to a particulate form of a platinum-containing hydrosilylation catalyst that will not cause premature curing when incorporated into organopolysiloxane compositions which cure by a hydrosilylation reaction.

2. Description of the Prior Art

Due to their unique advantages of a rapid curing rate and the absence of by-product evolution during curing, organopolysiloxane compositions which cure by a hydrosilylation reaction are widely used as silicone rubber compositions, coating compositions, and the like. Such organopolysiloxane compositions typically include at least one diorganopolysiloxane with at least two alkenyl groups in each molecule, an organohydrogenpolysiloxane with at least two silicon-bonded hydrogen atoms in each molecule, in an amount sufficient to bring about the curing of the diorganopolysiloxane; and a platinum-type catalyst. However, such organopolysiloxane compositions suffer from an inferior storage stability.

U.S. Pat. No. 4,293,677, which issued to Imai on Oct. 6, 1981 describes encapsulating organohydrogensiloxanes using complex coacervation and in-situ polymerization, two of the most common microencapsulation techniques. In accordance with example 1 of this patent, an aqueous gelatin solution adjusted to a pH of 9.5 was added to a solution of a trimethylsiloxy terminated polymethylhydrogensiloxane in molten paraffin wax. A 10 percent by weight solution of gum arabic is then added and the pH of the resultant emulsion is adjusted to 4 over a period of two hours to precipitate the mixture of the two polyelectrolytes that forms the encapsulant. The encapsulant is cured by gradually heating the dispersion of coated particles to a temperature of 50 degrees C.

The in-situ polymerization process exemplified in example 2 of the Imai patent involves polymerization of styrene in the presence of a dimethylsiloxane/methylhydrogensiloxane copolymer as the dispersed phase of an emulsion wherein the aqueous phase contains a solubilized polyvinyl alcohol and potassium persulfate.

A disadvantage of encapsulating the organohydrogensiloxane reactant as taught by Imai et al. is the relatively large amount of encapsulating polymer that is introduced into the composition. Many of the thermoplastic organic polymers suitable for use as encapsulants are incompatible with the reactants present in the curable composition. The presence of relatively large amounts of incompatible polymers may detract from the appearance, physical properties and optical properties of the cured material.

One way to reduce the amount of incompatible encapsulating polymer introduced into a curable composition is to encapsulate the platinum-containing catalyst rather than the organohydrogensiloxane reactant as taught by Imai et al. One of the most effective classes of platinum-containing catalysts for curing organosiloxane compositions of the type described in the Imai et al. patent are reaction products of an inorganic platinum compound such as hexachloroplatinic acid with liquid vinyl-containing organosilicon compounds such as sym-tetramethyldivinyl disiloxane. The solution can then be diluted to the desired platinum content, typically between 0.1 and 1 percent by weight, using a liquid dimethylvinylsiloxy terminated polydimethylsiloxane. Alternatively, the undiluted reaction product can be used as a catalyst.

The prior art has attempted to improve the storage stability of platinum-containing hydrosilylation catalysts. One method for accomplishing this is disclosed in Japanese Patent Application Laid Open [Kokai] Number 49-134786 [134,786/74], which teaches the preparation of a platinum-type catalyst in powder form. Silicone resin and a platinum compound catalyst adsorbed on a finely divided material such as quartz powder, are mixed and kneaded on a hot roll and the resulting mixture is pulverized or ground.

U.S. Pat. No. 4,481,341, which issued to Schlak et al. on Nov. 6, 1984 describes thermosetting organosiloxane compositions comprising a polyorganosiloxane containing at least two ethylenically unsaturated hydrocarbon radicals per molecule, a polyorganohydrogensiloxane containing at least two silicon bonded hydrogen atoms per molecule and a platinum-containing catalyst that is dispersed in a finely divided, solid material, such as a silicone resin, at a concentration of from 0.001 to 5 percent by weight of platinum metal.

The finely divided material in which the catalyst is dispersed is virtually insoluble in either the aforementioned polyorganosiloxane or polyorganohydrogensiloxane and melts or softens at a temperature between 70 and 250 degrees C. The alleged advantage of these compositions disclosed by Schlak et al. is that the catalyst remains isolated from the other ingredients of the curable composition until the composition is heated sufficiently to melt the material in which the catalyst is dispersed. Because the organosilicon compounds present in the composition will not cure in the absence of the catalyst the composition can allegedly be stored for long periods of time without undergoing curing or even an increase in viscosity.

A disadvantage of Schlak et al. catalyst resides in the method used to prepare the catalyst composition. A solid block or sheet of resin containing the platinum composition dispersed throughout is ground to a fine powder. The random nature of the grinding operation makes it possible that some of the particles will contain platinum catalyst on their surface. Even trace amount of platinum have been shown to cause premature curing of the type of organosiloxane composition exemplified in this patent.

U.S. Pat. No. 4,784,879, which issued to Lee et al. on Nov. 15, 1988 describes the preparation of an encapsulated form of a platinum-containing hydrosilylation catalyst. The platinum-containing catalyst is encapsulated within one or two layers of thermoplastic organic polymers. The catalyst is prepared by polymerization or precipitation of the encapsulating polymer in the presence of the catalyst. The resultant microcapsules are then washed with a liquid that is a solvent for the catalyst but not for the encapsulating polymer. The exemplified compositions require one washing with methanol and one with cyclic dimethylsiloxane oligomers to ensure their storage stability when incorporated into a curable organosiloxane composition.

SUMMARY OF THE INVENTION

One objective of the present invention is to provide a platinum-type hydrosilylation catalyst in particulate form. When used as the curing catalyst in a hydrosilylation-curing organopolysiloxane composition, this catalyst composition provides an excellent storage stability while inducing a rapid curing upon heating. A second objective is to provide a method for the preparation of said particulate.

The particulate compositions comprise a platinum-containing hydrosilylation catalyst and a diorganopolysilane having a softening point of from 50° to 200° C. The average particle size of the particulate material does not exceed 100 micrometers, and the surface layer of the particulate is substantially free of the hydrosilylation catalyst.

DETAILED DESCRIPTION OF THE INVENTION

This invention provides a particulate composition comprising a platinum-containing hydrosilylation reaction catalyst dispersed in a polydiorganosilane having a softening point within the temperature range of from 50 to 200 degrees Centigrade, where the average particle size of said particulate does not exceed 100 micrometers and the surface layer of said particulate is substantially free of said catalyst.

To explain the present compositions in greater detail the diorganopolysilane ingredient of the present compositions must have a softening point in the range of 50 to 200 degrees Centigrade. A softening point below 50 degrees Centigrade will result in a substantial reduction in storage stability after addition to the hydrosilylation-curing organopolysiloxane composition. At softening points in excess of 200 degrees Centigrade, the temperature at which the platinum-containing catalyst becomes active is too high, and the catalytic function of the present compositions is essentially not realized. Viewed from these standpoints, it is preferred that the diorganopolysilane's softening point fall within the temperature range of 70 to 150 degrees Centigrade.

The molecular structure and chemical structure of the diorganopolysilane are not particularly critical. The only requirement is that the diorganopolysilane be impermeable with respect to the platinum-containing hydrosilylation catalyst and that it not cause any deterioration or quality changes in the presence of the catalyst. For example, when a platinum/olefin complex catalyst is used, diorganopolysilanes containing silicon-bonded hydrogen atoms should be avoided.

Suitable diorganopolysilanes can be represented by the average unit formula

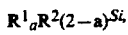

$$R^1_a R^2_{(2-a)} Si$$

where $R^1$ is methyl, $R^2$ is phenyl and the value of a is from 0.3 to 1.7, inclusive. Specific examples of suitable polydiorganosilanes include but are not limited to polymethylphenylsilane, methylphenylsilane-dimethylsilane copolymers, and polymethylcyclohexylsilane.

The platinum-containing hydrosilylation catalysts can be a metal from the platinum group of the periodic table of the elements, compounds these elements and compositions based on these metals and compounds which exhibit a catalytic activity with respect to hydrosilylation reactions. Examples of suitable platinum-containing hydrosilylation reaction catalysts include but are not limited to finely divided platinum, chloroplatinic acid, alcohol-modified chloroplatinic acid, platinum/diketone complexes, platinum/olefin complexes, chloroplatinic acid/alkenylsiloxane complexes, and any of the preceding catalysts supported on a carrier such as alumina silica or carbon black. Among these suitable catalysts platinum/olefin complexes and chloroplatinic acid/alkenylsiloxane complexes are preferred, based on their high catalytic activity in a hydrosilylation reactions, platinum/alkenylsiloxane complexes of the type disclosed in Japanese Patent Publication Number 42-22924 [22,924/67] are particularly preferred.

The particulate compositions of the present invention comprise a diorganopolysilane and a platinum-containing hydrosilylation reaction catalyst as described in the preceding specification.

It is essential that the average diameter of the particles constituting the present compositions not exceed 100 micrometers in order for the catalytic activity to develop satisfactorily and in order to maintain a stable dispersion upon addition to organopolysiloxane compositions.

The relative concentrations of diorganopolysilane and platinum-type hydrosilylation reaction catalyst should be equivalent to a concentration of platinum metal in the composition of from 0.01 to 5 weight percent.

The particulate composition of this invention consists essentially of a mixture of diorganopolysilane and a platinum-containing hydrosilylation catalyst that is encapsulated by a layer of diorganopolysilane which essentially does not contain any catalyst. As a consequence of this, hydrosilylation-curing organopolysiloxane compositions which contain this particulate composition display an excellent storage stability.

One of the characterizing features of the present compositions, namely the absence of platinum-containing catalyst in the surface layers of the particles, is achieved by washing a particulate catalyst composition with a liquid which is a solvent for said platinum-containing hydrosilylation reaction catalyst and a non-solvent for said diorganopolysilane.

The procedure for preparing a mixture of a diorganopolysilane with a softening point of from 50 to 200 degrees Centigrade and a platinum-containing hydrosilylation catalyst is not particularly critical. Examples of such procedures include but are not limited to mixing the diorganopolysilane and platinum-containing hydrosilylation catalyst on a hot roll, or dissolving the digrganopolysilane and catalyst in a co-solvent and then removing the co-solvent by evaporation. Procedures for preparing a particulate form of such mixtures include known methods for grinding or pulverizing of solid mixtures using mechanical means as well as methods in which a solvent solution of the mixture is sprayed into a spray drier to rapidly evaporate the solvent.

A preferred method for preparing the present composition involves the following sequence of steps:

(A) Preparing a solution of a platinum-containing hydrosilylation reaction catalyst and a diorganopolysilane with a softening point in the temperature range of 50 to 200 degrees Centigrade by dissolving said diorganopolysilane and catalyst in a water-immiscible liquid, and then preparing an aqueous dispersion of said solution by adding said solution to surfactant-containing water while stirring or shaking the water.

(B) Evaporatively removing the water-immiscible liquid from said aqueous dispersion at a temperature below the softening point of the diorganopolysilane to yield an aqueous dispersion of a particulate comprising the diorganopolysilane and the platinum containing hydrosilylation catalyst, and then separating the particulate material from the aqueous dispersion.

(C) Washing the particulate with a solvent in which the catalyst is soluble and in which said diorganopolysilane is insoluble.

To explain the preceding method in greater detail in step (A) a homogeneously mixed solution of diorganopolysilane and a platinum-containing hydrosilylation reaction catalyst is dispersed in microparticulate form in water to prepare an aqueous or water-based dispersion. The solvent used here should homogeneously dissolve both the diorganopolysilane and the platinum-type hydrosilylation reaction catalyst, and must also be immiscible with water. Furthermore, in order to facilitate removal of the solvent in step (B), it is preferred that the boiling point of this solvent under ambient pressure not exceed 100 degrees Centigrade. Most preferably the boiling point of this solvent is from 30 to 70 degrees Centigrade.

Suitable solvents for step (A) included but are not limited to methylene chloride, chloroform, tetrahydrofuran, and diethyl ether. The particular surfactant used to generate the aqueous dispersion is not critical so long as it has the ability to generate a water-based dispersion, in emulsion or suspension form, of the solution of diorganopolysilane and platinum-containing hydrosilylation reaction catalyst. The only restriction on the surfactant is that it should not contain sulfur, phosphorus or other element that can cause a loss in catalytic activity of the platinum-containing hydrosilylation reaction catalyst. Suitable surfactants include but are not limited to water-soluble polymeric organic compounds such as partially hydrolyzed polyvinyl alcohol.

In process (B), a particulate material comprising the diorganopolysilane and the platinum containing hydrosilylation reaction catalyst is separated and recovered from the water-based solvent dispersion generated by process (A). Evaporative removal of the solvent from aqueous dispersion must be conducted at a temperature below the softening point of the diorganopolysilane in order to avoid damage to the shape of the particulate. Evaporative solvent removal can be efficiently carried out, for example, by injecting an inert gas such as nitrogen into the water-based solvent dispersion while maintaining the dispersion under ambient or reduced pressure. Separation of the particulate from the water can be carried out by filtration or centrifugal separation.

In process (C), the surface of the isolated particulate material is washed with a solvent to wash out and remove the platinum-containing hydrosilylation reaction catalyst present in the surface layer of the particulate. This washing solvent must be capable of dissolving the platinum-containing hydrosilylation reaction catalyst while at the same time it must not dissolve the diorganopolysilane. Selection of a particular washing solvent is based on the type of platinum-containing hydrosilylation reaction catalyst and diorganopolysilane used, however this washing solvent is typically an alcohol, preferably methyl alcohol or ethyl alcohol, or a low molecular weight organopolysiloxane.

Low molecular weight organopolysiloxanes are particularly suitable washing solvents when a platinum/alkenylsiloxane complex catalyst is used as the platinum-containing hydrosilylation reaction catalyst. Siloxane oligomers such as hexamethyldisiloxane and cyclic diorganosiloxanes such as octamethylcyclotetrasiloxane are particularly preferred.

The objective of the washing step, namely removal of catalyst from the surface of the particulate material, can be satisfactorily achieved simply by dispersing the particulate material in a large quantity of the washing solvent with stirring. The stirring efficiency can be boosted using, for example, ultrasound and the like, as long as such tactics do not cause a deterioration of the platinum-containing hydrosilylation reaction catalyst or diorganopolysilane. It is recommended that the wash temperature not exceed 30 degrees Centigrade.

The particulate obtained following the washing step is converted to a micropulverulent platinum containing hydrosilylation catalyst-containing particulate by evaporative removal of the washing solvent.

The structure of the present particulate composition is characterized by a mixture of platinum-containing hydrosilylation reaction catalyst and polydiorganosilane that is encapsulated by a layer of diorganopolysilane having a softening point of from 50 to 200 degrees Centigrade and which is essentially free of said catalyst. This composition does not exhibit hydrosilylation reaction-promoting catalytic activity particulate at temperatures close to room temperature because the platinum-containing hydrosilylation reaction catalyst cannot leak to the surface at such temperatures. Moreover, the particulate material can develop a hydrosilylation promoting catalytic activity at temperatures in excess of the diorganopolysilane's softening point because the platinum-containing hydrosilylation reaction catalyst bleeds out at such temperatures. Accordingly, the particulate of the invention is an extremely effective curing agent or curing promoter for single-package curable organopolysiloxane compositions which must have long-term storage stability at around room temperature.

As an example, a thermosetting organopolysiloxane composition exhibiting excellent storage stability is obtained by the addition of the particulate composition of this invention to a mixture of a diorganopolysiloxane having at least two alkenyl groups in each molecule and a quantity of SiH-containing organohydrogenpolysiloxane sufficient to crosslink the diorganopolysiloxane. The particulate composition of the present invention is also effective as a curing agent for polyether compositions comprising an organohydrogenpolysiloxane and a vinyl-terminated polyether.

The following examples are intended to describe preferred embodiments of the present invention and should not be interpreted as limiting the scope of the invention as defined in the accompanying claims. Unless otherwise specified all parts and percentages specified in the examples are by weight and viscosities were measured at 25 degrees C.

REFERENCE EXAMPLE 1

Preparation of a platinum/vinylsiloxane complex catalyst 160 g of 1, 3-divinyltetramethyldisiloxane and 32 g chloroplatinic acid ($H_2PtCl_6 \cdot 6H_2O$) were mixed under ambient conditions and then mixed with heating to 120 degrees Centigrade for 1 hour under a stream of nitrogen. A platinum/vinylsiloxane complex catalyst was obtained by removing the platinum black by-product by filtration and then removing the acid with a water wash. The platinum metal concentration in this catalyst was 4.25 weight %.

REFERENCE EXAMPLE 2

Synthesis of polymethylphenylsilane 44 g of sodium metal were added to 500 ml dry toluene. This mixture was heated to reflux temperature, at which time 170 g of methylphenyldichlorosilane were added dropwise, following which the reaction mixture was heated to reflux temperature for 8 hours After cooling, the reaction mixture was quenched by the addition of methyl alcohol and water. The oil layer (toluene layer) was separated from the resultant reaction mixture and washed with water, and the toluene was then evaporated off. The residue was dissolved in tetrahydrofuran, and a solid was recovered by adding methyl alcohol to induce precipitation. The resultant solid was a polymethylphenylsilane with an average molecular weight of 19,000 and a softening point of 135 degrees Centigrade.

REFERENCE EXAMPLE 3

Synthesis of methylphenylsilane-dimethylsilane copolymer

The procedure of Reference Example 2 was followed, but using a mixture of 60 g methylphenyldichlorosilane and 90 g dimethyldichlorosilane in place of the methylphenyldichlorosilane used in Reference Example 2. The product was a methylphenylsilanedimethylsilane copolymer with an average molecular weight of 40,000 and a softening point of 125 degrees Centigrade.

EXAMPLE 1

8.0 g polymethylphenylsilane prepared as described in Reference Example 2 and 1.0 g platinum/vinylsiloxane complex catalyst, prepared as described in Reference Example 1 were dissolved in 165 g methylene chloride. This methylene chloride solution was added to water containing 7.5 g polyvinyl alcohol (Gosenol GL-05 from Nippon Gosei Kagaku Kogyo Kabushiki Kaisha) while stirring the water in order to prepare a water-based dispersion of the methylene chloride solution. The entire quantity of methylene chloride was then evaporated off by bubbling nitrogen gas into this aqueous dispersion while it was maintained at a temperature of from 25 to 40 degrees Centigrade over 32 hours, yielding a suspension comprising a microfine solid dispersed in water. This suspension was placed in a centrifugal separator and the microfine solid powder was separated. 10 g of this powder was washed once with water, then with methyl alcohol, and then with hexamethyldisiloxane. Analysis of the particulate after washing showed it to be a powder with an average particle size of 7 micrometers containing 0.26 weight % platinum metal. The properties of this particulate as a hydrosilylation reaction catalyst were then investigated.

A hydrosilylation-curing organopolysiloxane composition was prepared as follows: 100 g of an alpha, omegadivinylpolydimethylsiloxane exhibiting a viscosity of 1,500 centistokes and 20 g. of fumed silica having a specific surface area of 200 m2/g and previously hydrophobicized with hexamethyldisilazane were mixed. This was followed by the addition with mixing to homogeneity of 2.8 g of a methylhydrogenpolysiloxane represented by the average molecular formula Me$_3$SiO(Me$_2$SiO)$_3$(MeHSiO)$_5$SiMe$_3$ 0 50 g of the washed powder prepared as described in the first section of this example was then added to 100 g of the resultant organopolysiloxane composition with mixing to homogeneity. The storage stability and thermal curing properties of the resultant curable organopolysiloxane composition were measured, and the obtained results are reported in Table 1. The following properties were determined using a Curastometer Model 3, from the Toyo Baldwin Company, as indicators of the curing properties: the time until initiation of curing of the organopolysiloxane composition at 150 degrees Centigrade ($I_t$) and the time to achieve 90% of the maximum torque value ($T_{90}$). With regard to the storage stability, the organopolysiloxane composition was allowed to stand for 90 days at 25 degrees Centigrade, and its change in viscosity was determined. For comparison, organopolysiloxane compositions were prepared as described above, but using the platinum/alkenylsiloxane complex catalyst obtained in Reference Example 1 in place of the washed powder. The platinum content provided by the concentration of platinum/alkenylsilane complex was equal to the platinum content provided by the washed powder. The curing properties and storage stability of this comparison composition were also measured, and the obtained results are reported in Table 1 as Comparison Example 1.

TABLE 1

| property | Example 1 powder after washing | Comparison Example 1 Pt/alkenyl-siloxane complex catalyst |
| --- | --- | --- |
| type of catalyst | | |
| curing properties | | |
| $I_t$ (minutes) | 1.2 | 0.1 |
| $T_{90}$ (minutes) | 11.0 | 0.2 |
| storage stability | | |
| viscosity immediately after preparation (centipoise) | 3300 cp | 3300 cp |
| viscosity after 90 days (centipoise) | 5500 cp | could not be measured (gelled after 5 minutes) |

EXAMPLE 2

8.0 g of the methylphenylsilane-dimethylsilane copolymer prepared as described in Reference Example 3 and 1.0 g of the platinum/vinylsiloxane complex catalyst prepared in Reference Example 1 were dissolved in 165 g methylene chloride. This methylene chloride solution was added to water containing 7 5 g polyvinyl alcohol (Gosenol GL-05 from Nippon Gosei Kagaku Kogyo Kabushiki Kaisha) while stirring the water in order to prepare a water-based dispersion of the methylene chloride solution. The entire quantity of methylene chloride was then evaporated off by injecting nitrogen gas into this aqueous dispersion at 25 to 40 degrees Centigrade over 32 hours, yielding a suspension comprising a microfine particulate dispersed in water. This suspension was placed in a centrifugal separator and the microfine particulate was separated. This powder was washed once with water, then with methyl alcohol, and then with cyclic dimethylsiloxanes. Analysis of the particulate after washing showed it to be a powder with an average particle size of 7 micrometers containing 0.26 weight % platinum, calculated as the metal.

The properties of this particulate as a hydrosilylation reaction catalyst were then investigated.

100 g of an alpha,omega-divinylpolydimethylsiloxane exhibiting a viscosity of 1,500 centistokes and 20 g of fumed silica exhibiting a specific surface area of 200 m$^2$/g and that had been previously hydrophobicized with hexamethyldisilazane were mixed, and 2.8 g methylhydrogenpolysiloxane with the average molecular formula $$Me_3SiO(Me_2SiO)_3(MeHSiO)_5SiMe_3$$

was then added with mixing to homogeneity to yield a hydrosilylation-curing organopolysiloxane composition. 0 50 g of the washed particulate prepared as described in the first section of this example was added, with mixing to homogeneity, to 100 g of this composition. The storage stability and thermal curing properties of the resultant curable organopolysiloxane composition were measured as in Example 1, and the obtained results are reported below.

Curing properties $I_t$ (minutes): 1.5
$T_{90}$ (minutes): 12.0

Storage stability viscosity immediately
after preparation (centipoise): 3300
viscosity after 30 days (centipoise): 4500

That which is claimed is:

1. A particulate composition comprising a platinum-containing hydrosilylation reaction catalyst dispersed in a polydiorganosilane having a softening point within the temperature range of from 50 to 200 degrees Centigrade, where the average particle size of said particulate does not exceed 100 micrometers and the surface layer of said particulate is substantially free of said catalyst.

2. A composition according to claim 1 wherein the principal ingredient of said platinum-containing hydrosilylation reaction catalyst is a platinum/olefin complex, said polydiorganosilane is represented by the general formula $$R^1_a R^2_{(2-a)} Si$$

where $R^1$ is methyl, $R^2$ is phenyl, the value of a is from 0.3 to 1.7, inclusive, and the absence of said catalyst in the surface layer of said particulate is achieved by washing the particulate with a liquid that is a solvent for said catalyst but not for said polydiorganosilane.

3. A composition according to claim 2 where said liquid is an alcohol or a low molecular weight organopolysiloxane.

4. A composition according to claim 3 where said composition includes a curable organopolysiloxane composition comprising a diorganopolysiloxane with at least two alkenyl groups in each molecule and an organohydrogenpolysiloxane with at least two silicon-bonded hydrogen atoms in each molecule, the amount of said orgagohydrogenpolysiloxane being sufficient to crosslink said diorganopolysiloxane.

5. A method for preparing the particulate composition of claim 1, said method comprising the following steps
   (A) preparing a solution consisting essentially of a platinum-containing hydrosilylation reaction catalyst and a diorganopolysilane with a softening point in the temperature range of 50 to 200 degrees Centigrade by dissolving said diorganopolysilane and said catalyst in a water-immiscible solvent for said diorganopolysilane and said catalyst,
   (B) preparing an aqueous dispersion of said solution by adding said solution to surfactant-containing water while stirring or shaking the water,
   (C) evaporatively removing said solvent from said aqueous dispersion at a temperature below the softening point of said diorganopolysilane to yield an aqueous dispersion of a particulate comprising said diorganopolysilane and said catalyst,
   (D) separating said particulate from said aqueous dispersion,
   (E) washing said particulate with a liquid in which said catalyst is soluble but in which said diorganopolysilane is insoluble.

6. A method according to claim 5 wherein the principal ingredient of said platinum-containing hydrosilylation reaction catalyst is a platinum/olefin complex, and said polydiorganosilane is represented by the general formula $$R^1_a R^2_{(2-a)} Si$$

where $R^1$ is methyl, $R^2$ is phenyl, and the value of a is from 0.3 to 1.7, inclusive.

* * * * *